(12) United States Patent
Madsen et al.

(10) Patent No.: US 12,110,870 B2
(45) Date of Patent: Oct. 8, 2024

(54) CONDUCTIVE CONNECTION FOR A WIND TURBINE BLADE

(71) Applicant: POLYTECH A/S, Bramming (DK)

(72) Inventors: Søren Find Madsen, Bramming (DK); Richard Baker, Bramming (DK); Lisa Carloni, Bramming (DK)

(73) Assignee: POLYTECH A/S, Bramming (DK)

( * ) Notice: Subject to any disclaimer, the term of this patent is extended or adjusted under 35 U.S.C. 154(b) by 0 days.

(21) Appl. No.: 18/258,637

(22) PCT Filed: Dec. 23, 2021

(86) PCT No.: PCT/EP2021/087470
§ 371 (c)(1),
(2) Date: Jun. 21, 2023

(87) PCT Pub. No.: WO2022/136632
PCT Pub. Date: Jun. 30, 2022

(65) Prior Publication Data
US 2024/0035448 A1    Feb. 1, 2024

(30) Foreign Application Priority Data
Dec. 23, 2020 (EP) ................................ 20216991

(51) Int. Cl.
*F03D 80/30* (2016.01)
*F03D 1/06* (2006.01)
*H02G 13/00* (2006.01)

(52) U.S. Cl.
CPC ......... *F03D 80/301* (2023.08); *F03D 1/0675* (2013.01); *F03D 80/30* (2016.05);
(Continued)

(58) Field of Classification Search
None
See application file for complete search history.

(56) References Cited

U.S. PATENT DOCUMENTS

| 7,494,324 B2* | 2/2009 | Hibbard | H02G 13/00 |
| | | | 416/241 A |
| 7,651,320 B2* | 1/2010 | Hansen | H02G 13/00 |
| | | | 416/1 |

(Continued)

FOREIGN PATENT DOCUMENTS

| CN | 105275738 A * | 1/2016 | B21D 39/03 |
| EP | 2 873 970 A1 | 5/2015 | |

(Continued)

OTHER PUBLICATIONS

"Electroplating", Jan. 3, 2020; Wikipedia (Year: 2020).*
(Continued)

*Primary Examiner* — Woody A Lee, Jr.
*Assistant Examiner* — Wesley Le Fisher
(74) *Attorney, Agent, or Firm* — Crowell & Moring LLP; John C. Freeman

(57) ABSTRACT

A conductive connection between a Carbon Fiber Reinforced Polymer (CFRP) element and one or more down conductor(s), the CFRP element being electrically conductive and has a face. The conductive connection including an interface conductive patch provided on the face of CFRP element for electrically connecting the CFRP element with the interface conductive patch, the interface conductive patch is electrically connected with the one or more down conductor(s).

20 Claims, 8 Drawing Sheets

(52) U.S. Cl.
CPC ........... *H02G 13/80* (2013.01); *F03D 1/0679* (2023.08); *F05B 2280/6003* (2013.01)

(56) References Cited

U.S. PATENT DOCUMENTS

| | | | |
|---|---|---|---|
| 9,575,097 B2 | 2/2017 | Kawashima et al. | |
| 10,584,684 B2* | 3/2020 | Nielsen | F03D 80/30 |
| 10,669,033 B2* | 6/2020 | Kinlen | H05B 3/145 |
| 11,248,587 B2* | 2/2022 | Christiansen | F03D 1/0675 |
| 11,555,482 B2* | 1/2023 | Girolamo | F03D 80/30 |
| 11,713,749 B2* | 8/2023 | March Nomen | F03D 80/30 |
| | | | 416/230 |
| 11,746,744 B2* | 9/2023 | Lykkegaard | F03D 1/0675 |
| | | | 416/146 R |
| 2007/0074892 A1* | 4/2007 | Hibbard | F03D 80/00 |
| | | | 174/117 FF |
| 2010/0329881 A1 | 12/2010 | Mendez Hernandez et al. | |
| 2012/0321468 A1 | 12/2012 | Hansen | |
| 2015/0137802 A1 | 5/2015 | Kawashima et al. | |
| 2015/0204311 A1 | 7/2015 | Clemens | |
| 2019/0193862 A1* | 6/2019 | Kinlen | B64D 15/20 |
| 2020/0232444 A1* | 7/2020 | Irissappane | F03D 80/30 |
| 2020/0263657 A1* | 8/2020 | Badger | F03D 3/062 |
| 2022/0034305 A1 | 2/2022 | Aubrion et al. | |
| 2023/0003186 A1* | 1/2023 | Lykkegaard | F03D 1/0675 |
| 2023/0041394 A1* | 2/2023 | Eiriksson | F03D 80/30 |

FOREIGN PATENT DOCUMENTS

| | | |
|---|---|---|
| JP | 2013/178999 A | 9/2013 |
| WO | WO 2015/055216 A1 | 4/2015 |
| WO | WO 2020/084052 A1 | 4/2020 |

OTHER PUBLICATIONS

English translation of CN105275738A (Year: 2016).*
International Search Report dated Apr. 4, 2022 (4 pages) from PCT Priority Application PCT/EP2021/087470 filed on Dec. 23, 2021.
International Preliminary Report on Patentability dated Jun. 13, 2023 (one page) with appended Written Opinion of the International Searching Authority dated Apr. 4, 2022 (6 pages) from PCT Priority Application PCT/EP2021/087470.

* cited by examiner

CONDUCTIVE CONNECTION FOR A WIND TURBINE BLADE

This application is a National Stage application of International Application No. PCT/EP2021/087470, filed Dec. 23, 2021, the entire contents of which are incorporated herein by reference.

This application claims priority under 35 U.S.C. § 119(a) to European Patent Application No. 20216991.8, filed on Dec. 23, 2020, the entire contents of which are incorporated herein by reference.

BACKGROUND OF THE INVENTION

Field of the Invention

The present invention relates to a conductive connection between a Carbon Fibre Reinforced Polymer (CFRP) element and one or more down conductor(s).

Description of the Related Art

CFRP elements are being incorporated in many applications and constructions, primarily as structural elements for enhancing the strength and rigidity of the constructions while still optimizing on the weight of the construction.

CFRP elements are electrically conductive, hence when these elements are being used in construction being exerted for lightning strikes, it is necessary to protect these CFRP elements by lightning protection systems for controlling the current being led through the CFRP elements and avoiding internal differential voltages to cause flashovers.

This lightning protection coordination is therefore achieved by a combination of insulation, separation and equipotentialization of the conductive materials in the construction. Since the CFRP elements are optimized to the intended use and strength it is often difficult to provide a conductive connection between the CFRP element and a down conductor without influencing on the strength of the CFRP element.

It is an object of the present invention to wholly or partly overcome the above disadvantages and drawbacks of the prior art. More specifically, it is an object to provide an improved conductive connection between a Carbon Fibre Reinforced Polymer (CFRP) element and one or more down conductor(s) without interfering with the strength of the CFRP element.

SUMMARY OF THE INVENTION

The above objects, together with numerous other objects, advantages and features, which will become evident from the below description, are accomplished by a solution in accordance with the present invention by a conductive connection between a Carbon Fibre Reinforced Polymer (CFRP) element and one or more down conductor(s), the CFRP element being electrically conductive and has a face, the conductive connection comprising an interface conductive patch provided on the face of CFRP element for electrically connecting the CFRP element with the interface conductive patch, the interface conductive patch is electrically connected with the one or more down conductor(s).

Many constructions are incorporating CFRP elements for enhancing the strength of the constructions. Hence, the CFRP elements are part of the structural parts of the construction, and since they are made of CFRP being conductive, the CFRP elements may be able to lead lightning current which may jeopardise the strength of the CFRP element and the bonding to the other parts of the construction. This is solved by the present invention by ensuring a conductive connection between the CFRP element and a down conductor without interfering with the structure and strength of the CFRP element.

Furthermore, a conductive coating may be applied on a part of the face, the conductive coating being applied as an intermediate layer between the face and the interface conductive patch.

Also, the conductive coating may be applied by electroplating.

Moreover, the conductive coating may be applied by brush, spraying, dipping or similar application methods.

In addition, the conductive coating may comprise metal.

In an embodiment, the conductive coating may comprise graphene.

Furthermore, the conductive coating may be configured to ensure proper conductivity between the CFRP element and the interface conductive patch.

Also, the interface conductive patch may be arranged opposite the conductive coating and fasten to the conductive coating by providing a structured layer of carbon fibres over the interface conductive patch.

The structured layer may be a GFRP Biax. The structured layer and/or the GFRP Biax may be configured to assist the current transfer from the interface conductive patch to the face or vice versa.

Moreover, the interface conductive patch may be provided by adhering the interface conductive patch to the face by means of a conductive adhesive arranged between the face and the interface conductive patch.

In addition, the interface conductive patch may be provided by arranging the interface conductive patch on the face and applying a structured layer of carbon fibres over the face and the interface conductive patch.

Furthermore, the interface conductive patch may be provided by sandwiching the interface conductive patch between a first structured layer of carbon fibres and a second structured layer of carbon fibres, the first structured layer is applied on the face.

Also, the structured layer of carbon fibres may comprise a woven and/or nonwoven layer.

In an embodiment, the woven and/or nonwoven layer may comprise CFRP Biax, Triax or similar woven material.

In an embodiment, the woven and/or nonwoven layer may comprise CFRP/GFRP hybrid materials in Biax, Triax or similar woven configuration.

Moreover, the interface conductive patch may comprise metal.

Additionally, the metal may be copper (Cu), aluminium (Al), silver (Ag), gold (Au), or any alloys thereof.

Furthermore, the interface conductive patch may be made of non-metallic materials such as a composite or fibres.

Also, the interface conductive patch may be a woven patch mesh or expanded metal patch foil.

Moreover, the interface conductive patch may have a first part being configured to be connected with the face and a second part being outside the face. The first part and the second part may be electrically connected.

In addition, the down conductor may comprise a sheet and/or a cable.

Furthermore, the sheet may be an expanded metal foil or woven metal mesh.

The sheet may be made of conductive material.

Also, the conductive material of the sheet may be metal such as aluminium, copper, steel or associated alloys.

Moreover, the conductive material of the sheet may be non-metallic such as a composite or fibres.

In addition, the down conductor may be a cable, or a bar made of conductive material such as metal.

In an embodiment, the interface conductive patch may comprise a conductive connection patch point being configured to electrically connecting the interface conductive patch to the down conductor.

Furthermore, the conductive connection patch point may be made of metal or other conductive materials, or a combination thereof.

The metal may be tin (Sn), aluminium (Al), copper (Cu), brass, silver (Ag), gold (Au), or any alloys thereof.

Also, the conductive connection patch point may comprise a first disc and a second disc. The first disc may be arranged on a first side of the interface conductive patch and the second disc is arranged on a second side of the conductive patch opposite the first disc, the first disc and the second disc being connected.

Moreover, the interface conductive connection patch point may be mechanically and electrically connected with the interface conductive patch.

In addition, the conductive connection patch point may be adhered to the conductive patch by a conductive adhesive.

In an embodiment, a thread may be provided in the conductive connection patch point.

Furthermore, the conductive connection patch point may be arranged on the interface conductive patch in a distance from the connection with the face.

The sheet may comprise one or more conductive connection sheet points.

Also, the conductive connection sheet points may be made of metal or other conductive materials, or a combination thereof.

Moreover, the metal may be tin (Sn), aluminium (Al), copper (Cu), brass, silver (Ag), gold (Au), or any alloys thereof.

In addition, the conductive connection sheet point may comprise a first point layer and a second point layer. The first layer may be made of a first material and the second layer is made of a second material.

Furthermore, the first material may be different from the second material.

Moreover, the conductive connection sheet points may be directly or indirectly connected with the conductive connection patch points.

Also, each conductive connection patch and/or point conductive connection sheet point may have a geometry exhibiting an outer and closed curvature with a minimum radius of curvature of between 3 mm to 200 mm, preferably between 5 mm to 100 mm.

Additionally, the conductive connection patch point and/or conductive connection sheet points may have a semi major axis and semi minor axis.

Furthermore, the semi major axis and semi minor axis may be equal providing a circular outer periphery.

Moreover, the semi major axis and semi minor axis may be different providing an oval or elliptic outer periphery.

Also, the semi major axis may be oriented in a predetermined angle in relation to a predetermined axis of the CFRP element.

The predetermined angle may be between 0 degrees and 90 degrees.

In addition, the conductive connection patch point and/or the conductive connection sheet points may be partly or fully circular or oval.

Furthermore, the conductive connection patch point and/or the conductive connection sheet points may have an asymmetrically shape.

Also, the outer periphery of the conductive connection patch point and/or the conductive connection sheet points may be defined by curved lines and straight lines.

In addition, the conductive connection patch point and/or the conductive connection sheet points may have a thickness, the thickness may be larger than 0.5 mm, preferably larger than 1.0 mm.

Furthermore, the thickness of the conductive connection patch point and/or the conductive connection sheet point may be extending in both directions with respect to a thickness of the patch and/or sheets.

Moreover, the conductive connection sheet points may be mechanically connected with the sheet.

Additionally, the conductive connection sheet points may be adhered to the sheet by a conductive adhesive.

Also, a receptor bolt may be screwed through the conductive connection sheet point and into the conductive connection patch point of the interface conductive patch.

A thread may be provided in the conductive connection sheet point.

Furthermore, an intermediate cable may be connecting the conductive connection patch point and the conductive connection sheet point.

Moreover, the CFRP element may be a structural element.

Also, the CFRP element may be a girder or a spar arranged in a wind turbine blade.

In addition, the CFRP element may be a mast or a part of a mast.

In an embodiment, the CFRP element may comprise pultruded carbon members.

The present also relates to a lightning protection system comprising a conductive connection as described above.

The present invention also relates to a wind turbine blade comprising a lightning protection system as described above.

The present invention also relates to a method of providing a conductive connection between a Carbon Fibre Reinforced Polymer (CFRP) element and one or more down conductor(s), the CFRP element being electrically conductive, comprising
   providing a CFRP element having a face,
   providing an interface conductive patch,
   applying the interface conductive patch on the face of CFRP element for ensuring electrically connection between the CFRP element and the conductive patch.

Furthermore, a conductive coating may be applied on the face before the interface conductive patch is applied on the conductive coating and the face, the conductive coating is applied by electroplating, brush, spraying, dipping or similar application methods.

In addition, the face may be cleaned and/or sanded before the conductive coating is applied.

Also, the electroplating may be performed by
   providing the CFRP element as a cathode,
   providing a coating solution,
   providing a sacrificial anode,
   applying a current by an external power supply.

Moreover, the method may further comprise
   localising an area to be coated on the face,
   saturating a brush/cloth/sponge with the coating solution,
   connecting an external power supply with an anode in contact with the brush/cloth/sponge,
   applying the saturated brush/cloth/sponge to the area.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION

Figure 1:
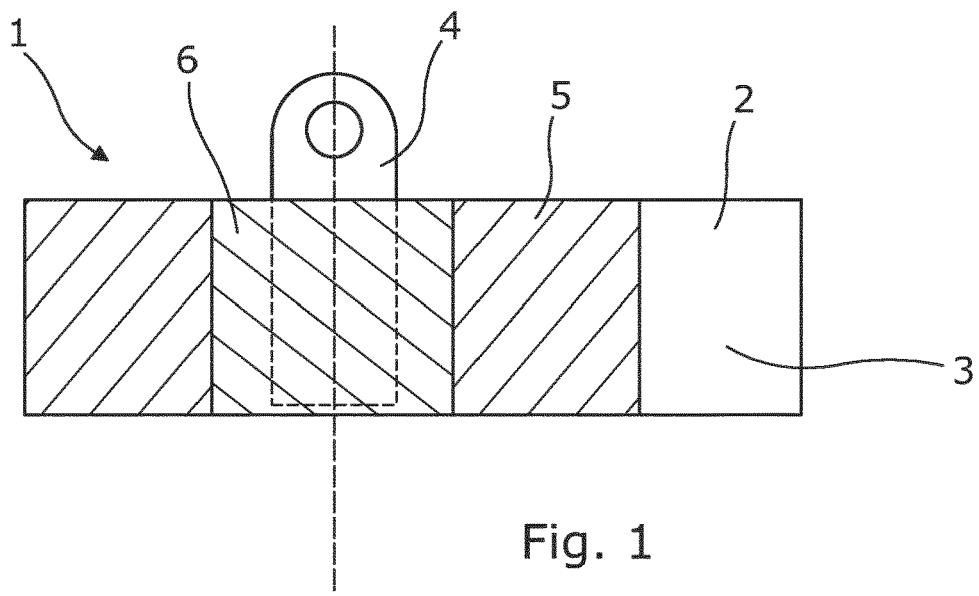
FIG. 1 shows an embodiment of a conductive connection according to the invention.

FIG. 1 shows a conductive connection 1 between a Carbon Fibre Reinforced Polymer (CFRP) element 2 and one or more down conductor(s) (not shown). The CFRP element 2 being electrically conductive and has a face 3, the conductive connection 1 comprising an interface conductive patch 4 provided on the face 3 of CFRP element 2 for electrically connecting the CFRP element 2 with the interface conductive patch 4, the interface conductive patch 4 is electrically connected with the one or more down conductor(s) (not shown).

In the embodiment shown in FIG. 1, the interface conductive patch 4 is provided by sandwiching the interface conductive patch 4 between a first structured layer 5 of carbon fibres and a second structured layer 6 of carbon fibres, the first structured layer 5 is applied on the face 3 and the second structured layer 6 is applied over the first structured layer 5 and the interface conductive patch 4.

The interface conductive patch 4 may also be provided by arranging the interface conductive patch 4 on the face 3 and applying a first structured layer 5 of carbon fibres over the face 3 and the interface conductive patch 4.

The structured layer 5, 6 of carbon fibres may comprise a woven and/or non-woven layer. The woven and/or nonwoven layers may comprise CFRP Biax, Triax or similar woven material. In addition, hybrid layers or plies comprising a mix of carbon fibres and glass fibres may also be used.

By arranging the structured layers over the interface conductive patch 4 it is ensured that the interface conductive patch 4 is securely maintained in relation to the CFRP element and that proper conductivity between the CFRP element and the interface conductive patch is obtained.

In another not shown embodiment the interface conductive patch may be provided by adhering the interface conductive patch to the face by means of a conductive adhesive arranged between the face and the interface conductive patch.

Figure 2:
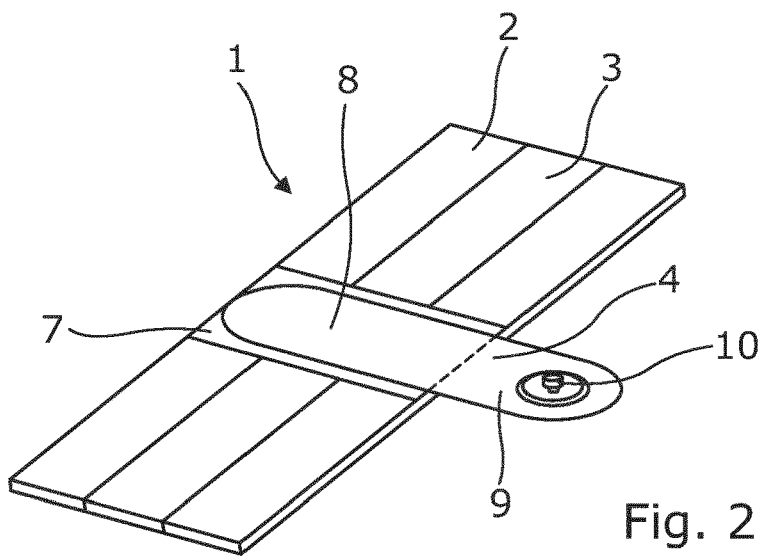
FIG. 2 shows another embodiment of a conductive connection according to the invention.

In FIG. 2, another embodiment of a conductive connection 1 is shown. In this embodiment, a conductive coating 7 is applied on a part of the face 3, the conductive coating 7 being applied as an intermediate layer 7 between the face 3 and the interface conductive patch 4. The CFRP element 2 is in the present embodiment built up of three pultruded carbon members, however in other embodiments, a different number of pultruded carbon members may be used.

The conductive coating 7 may be applied by brush, spraying, dipping or similar application methods.

In addition, only a part of the face is being coated in that area wherein the interface conductive patch is being arranged and connected with the face. Several areas along the CFRP element may be coated so that several interface conductive patches may be arranged along an extension of the CFRP element.

Furthermore, the conductive coating 7 may applied by electroplating techniques.

The conductive coating may then comprise metal so that the coating being applied then may be a metal plating arranged and connected with the face 3. The metal may be copper (Cu), aluminium (Al), silver (Ag), gold (Au), or any alloys thereof.

The conductive coating 7 or plating is configured to ensure proper and enhanced conductivity between the CFRP element 2 and the interface conductive patch 4 without interfering with the structure and strength of the CFRP element.

By coating or plating the face of the CFRP element a higher degree of conductivity between the carbon fibres of the CFRP element and the coating or plating is obtained which again provide a higher degree of conductivity to the interface conductive patch and therefrom to the down conductor.

In addition, the interface conductive patch 4 is arranged opposite the conductive coating as shown in FIG. 2, and then subsequently may be fasten to the conductive coating or plating by providing a structured layer of carbon fibres over the interface conductive patch (not shown).

The present invention also relates to a method of providing a conductive connection between a Carbon Fibre Reinforced Polymer (CFRP) element and one or more down conductor(s), the CFRP element being electrically conductive, comprising providing a CFRP element having a face,
providing an interface conductive patch,
applying the interface conductive patch on the face of CFRP element for ensuring electrically connection between the CFRP element and the conductive patch.

As described above, a conductive coating may be applied on the face before the interface conductive patch is applied on the conductive coating and the face, the conductive coating is applied by electroplating, brush, spraying, dipping or similar application methods.

In advance of the conductive coating being applied the face may cleaned and/or sanded or machined for any residues or contamination for providing enhanced adherence of the coating or plating.

As mentioned above, a conductive coating may be applied on the face by electroplating. In an embodiment the electroplating may be performed by providing the CFRP element as a cathode,
providing a coating solution,
providing a sacrificial anode,
applying a current by an external power supply.

In addition, the electroplating process may comprise
localising an area to be coated on the face,
saturating a brush/cloth/sponge with the coating solution,
connecting an external power supply with an anode in contact with the brush/cloth/sponge,
applying the saturated brush/cloth/sponge to the area.

This method is expedient when only a small area of a large CFRP element is to be electroplated.

As appreciated by the skilled person other electroplating processes may be applied according to the size and handling of the CFRP elements.

Also, the conductive coating may comprise graphene.

As shown in FIG. 2 the interface conductive patch 4 may have a first part 8 being configured to be connected with the face 3 and a second part 9 being outside the face 3. The first part 8 and the second part 9 are electrically connected.

Furthermore, the interface conductive patch 4 comprises in present embodiment a conductive connection patch point 10 being configured to electrically connecting the interface conductive patch 4 to the down conductor (not shown). In the embodiment shown in FIG. 2 the conductive connection patch point 10 is arranged in connection with the second part 9 of the interface conductive patch 4.

Figure 3:
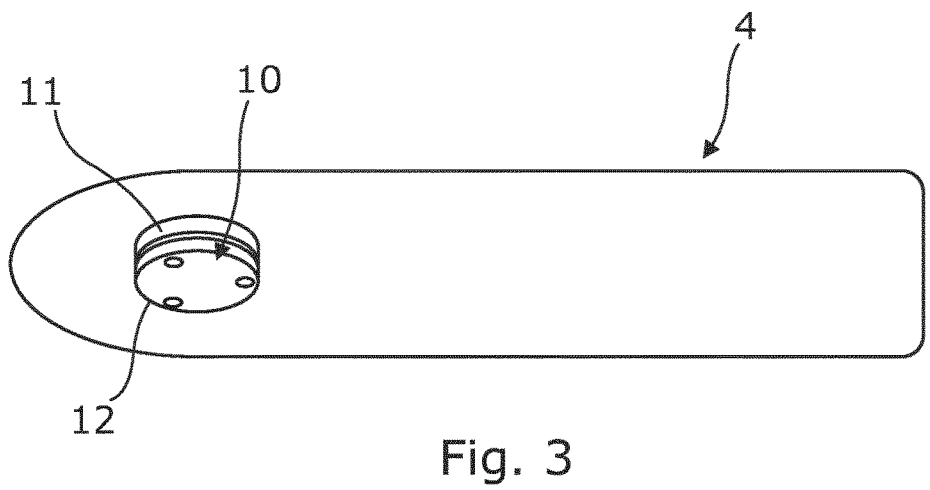
FIG. 3 shows an embodiment of an interface conductive patch.

In FIG. 3 an embodiment of the interface conductive patch is shown. The interface conductive patch 4 may be made of a sheet which comprises metal or non-metallic materials such as a composite or fibres.

When the interface conductive patch 4 is fully or partly being made of metal, the metal is preferably copper (Cu), aluminium (Al), silver (Ag), gold (Au), or any alloys thereof.

Furthermore, the interface conductive patch 4 may be a woven patch mesh or expanded metal patch foil for ensuring proper conductivity in the interface conductive patch 4.

The interface conductive patch 4 may have a thickness of around 0.1 mm to 2.0 mm.

In connection with the interface conductive patch 4, a conductive connection patch point 10 is arranged. The conductive connection patch point 10 may be made of metal or other conductive materials, or a combination thereof.

The metal of the conductive connection patch point 10 may be tin, aluminium, copper, brass, silver, gold, or any alloys thereof.

The conductive connection patch point 10 may comprise a first disc 11 and a second disc 12. The first disc 11 may be arranged on a first side of the interface conductive patch 4 and the second disc 12 is arranged on a second side of the conductive patch 4 opposite the first disc 11, the first disc and the second disc being connected. In a preferred embodiment a tin disc (not shown) is arranged around the mesh of the interface conductive patch 4 for enhancing the conductivity between the mesh and the discs.

Furthermore, the interface conductive connection patch point 10 may be mechanically and electrically connected with the interface conductive patch 4.

Also, the conductive connection patch point 10 may be adhered to the interface conductive patch by a conductive adhesive.

Moreover, a thread may be provided in the conductive connection patch point 10 for facilitating that a cable or other conductive members may be connected with the conductive connection patch point 10.

Figure 4:
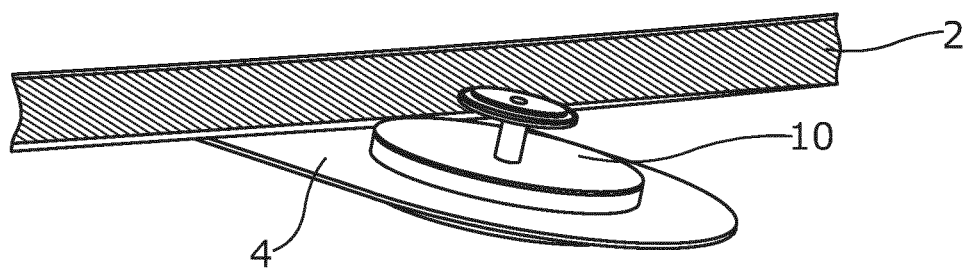
FIG. 4 shows an interface conductive patch connected with the CFRP element.

As seen in FIG. 2 and FIG. 4 the conductive connection patch point 10 may be arranged on the interface conductive patch 4 in a distance from the connection to the face 3.

In the following the present invention will be further described in connection with a lightning protection system for a wind turbine blade. However, the present invention may also be applied in connection with other CFRP elements such as for instance a mast comprising one or more CFRP elements and which mast may be exerted for lightning strikes.

Thus, the CFRP element may be a structural element, such as for instance a girder or a spar arranged in a wind turbine blade.

Furthermore, the CFRP element may comprise pultruded CFRP members as seen in FIG. 2.

Figure 5:
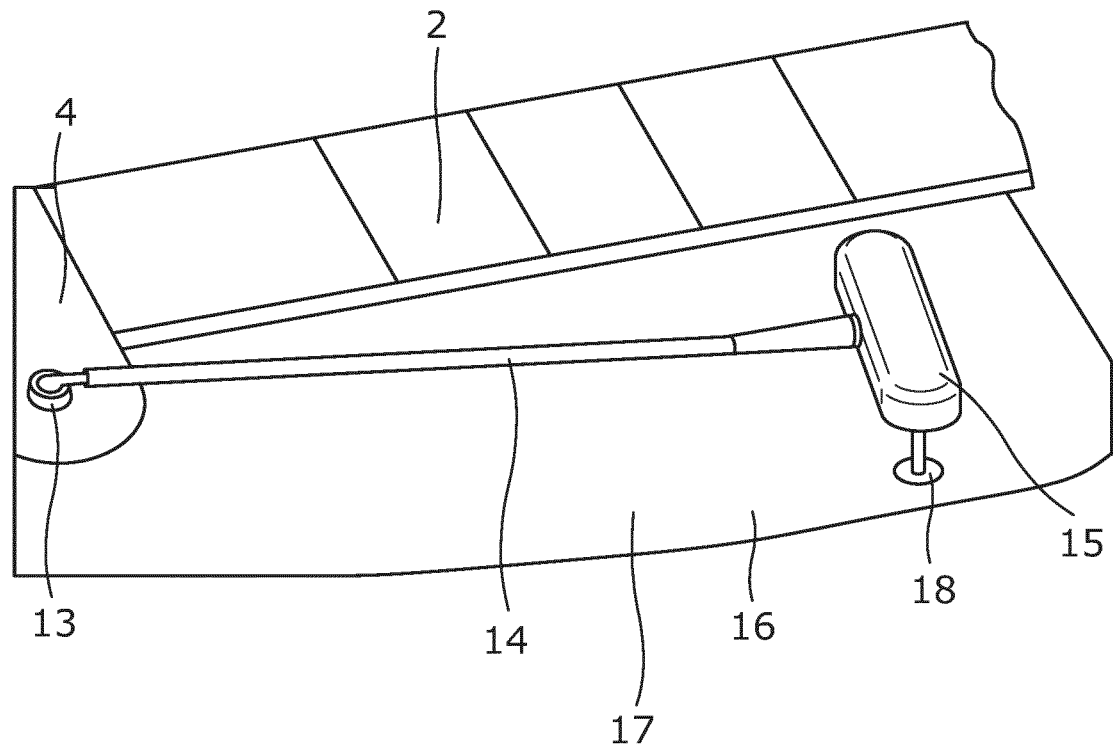
FIGS. 5 and 6 show interface conductive patches connected with a down conductor via a connection block and a connection point connector.

As seen in FIG. 5, the interface conductive patch 4 is electrically connected to the CFRP element 2. The interface conductive patch 4 has a cable connector 13 which again is connected with an intermediate cable 14, which in turn is connected with an intermediate connection block 15. Hereby current running in the CFRP element 2 may be led to the intermediate connection block 15 in an expedient manner. The intermediate connection block 15 may be connected to a down conductor 16, here in the form as a sheet 17 via conductive connection sheet point 18.

The down conductor may as described above comprise a sheet or it may be a cable or a bar. In the circumstance where the down conductor is a cable, the cable may be connected directly to the interface conductive patch via the cable connector.

The sheet 17 may be an expanded metal foil or woven metal mesh. The sheet is made of conductive material, such as metal being for instance aluminium, copper, steel or associated alloys.

When the down conductor is a cable, or a bar, the down conductor may be made of conductive material such as metal.

Figure 6:
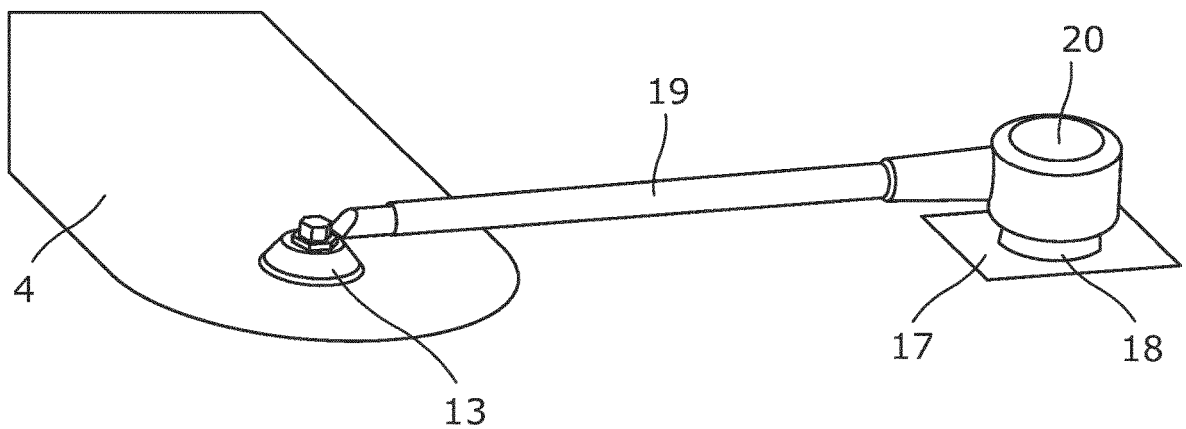

In FIG. 6, the interface conductive patch 4 is shown. The interface conductive patch 4 has a cable connector 13 being electrically connected with a cable 19. The cable 19 electrically connects the cable connector 13 with a connection point connector 20. The connection point connector 20 is connected with a conductive connection sheet point 18 arranged in the sheet 17. Hereby a flexible connection is obtained.

Figure 7:
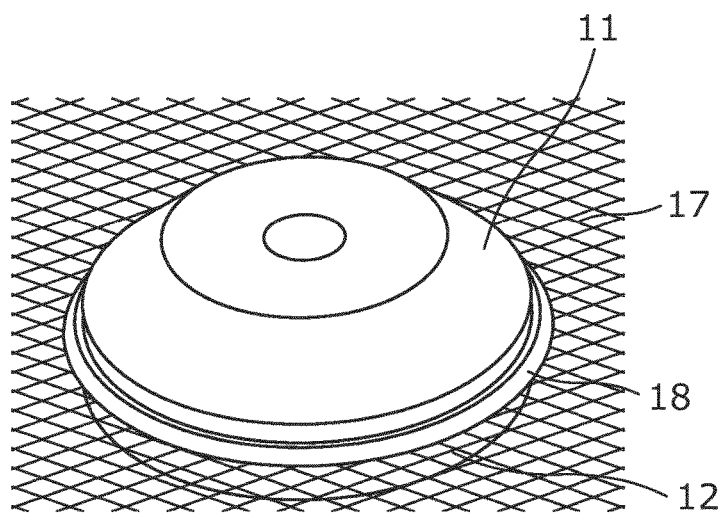
FIGS. 7 to 9 show different embodiments of the conductive connection points.
Figure 8:
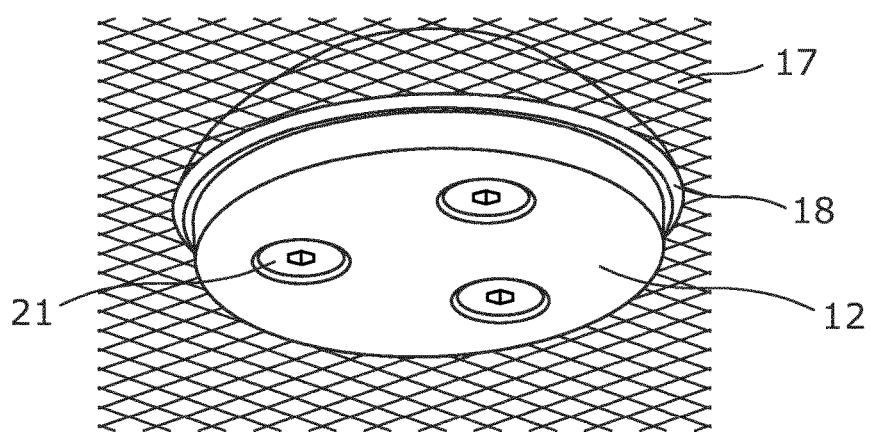

FIGS. 7 and 8 show how the connection point connector 20 is connected with the conductive connection sheet point 18. A first connector disc 11 is arranged on one side of the conductive connection sheet point 18 and a second connector disc 12 is arranged on the opposite side of the conductive connection point thereby encapsulating the conductive connection sheet point 18. The conductive connection sheet point 18 is electrically connected with the sheet 17 as described earlier. In the present embodiment the first connector disc 11 and the second connector disc 12 are connected by means of connector bolts 21 as seen in FIG. 8.

Figure 9:
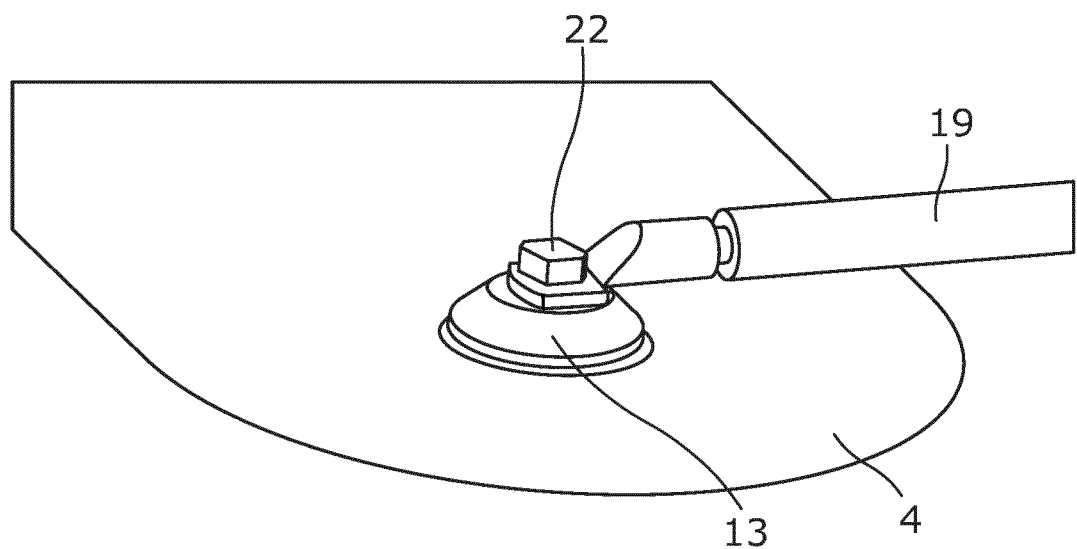

In FIG. 9 the cable connector 13 of the interface conductive patch 4 is shown. The cable 19 is connected to the cable connector via a bolt head 22. This embodiment assists in ensuring that any manufacturing tolerances may be overcome by the cable 19.

As mentioned above, when the down conductor is a sheet one or more conductive connection sheet points may be arranged in the sheet for enabling conductivity.

In the same manner as with the conductive connection patch point, the conductive connection sheet point may be made of metal or other conductive materials, or a combination thereof. The metal may be tin, aluminium, copper, brass, silver, gold, or any alloys thereof.

The conductive connection sheet point may comprise a first point layer and a second point layer. The first layer may be made of a first material and the second layer is made of a second material. The first material may be different from the second material.

Furthermore, the conductive connection sheet points may be directly or indirectly connected with the conductive connection patch points.

Figure 10:
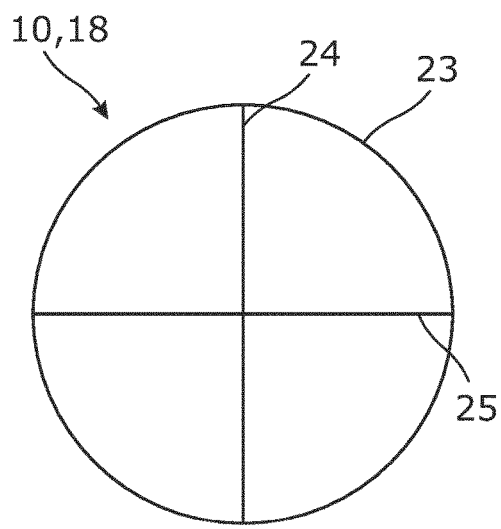
FIGS. 10 to 13 show different shapes of a conductive connection point.

In FIG. 10 an embodiment of a conductive connection patch point 10 or conductive connection sheet point 18 is shown. Each point 10, 18 may have a geometry exhibiting an outer and closed curvature 23 with a minimum radius of curvature of between 3 mm to 200 mm, preferably between 5 mm to 100 mm.

In addition, the point 10, 18 has a semi major axis 24 and semi minor axis 25 as shown in FIG. 10. When the semi major axis 24 and semi minor axis 25 are equal in length a circular outer periphery of the conductive connection point is provided as shown in FIG. 10.

Figure 11:
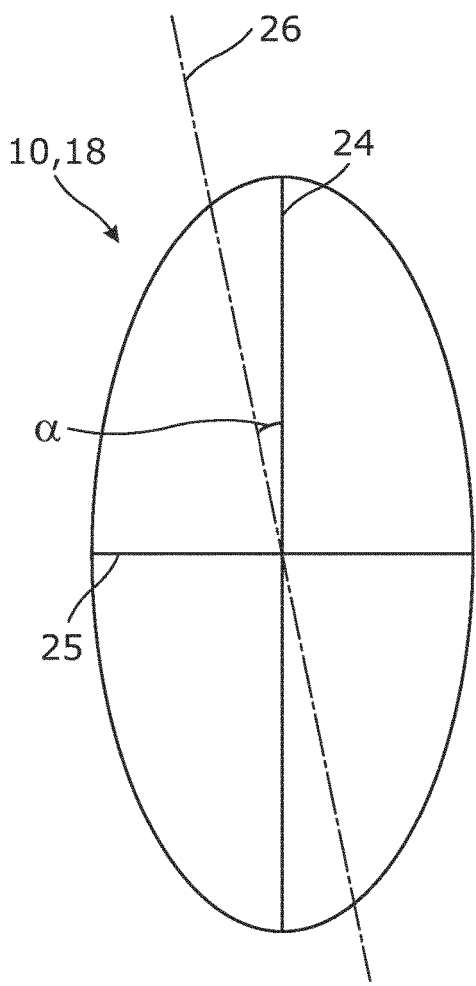

When the semi major axis 24 and semi minor axis 25 are different an oval or elliptic outer periphery of the point 10, 18 is provided as shown in FIG. 11. In addition, the semi major axis 24 may be oriented in a predetermined angle α in relation to a longitudinal axis 26 of the wind turbine blade. The predetermined angle α may be between 0 degrees and 90 degrees.

Hence, the points 10, 18 may be partly or fully circular or oval.

In addition, the points 10, 18 may have an asymmetrically shape.

Figure 12:
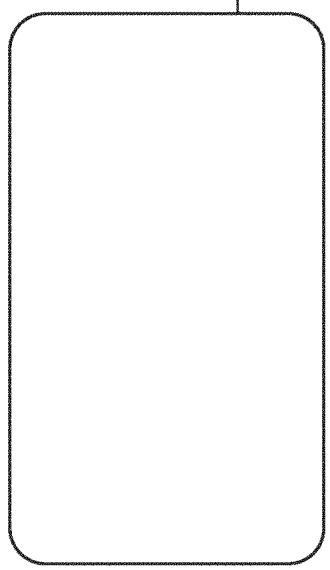

Also, the outer periphery 27 of the points 10, 18 may be defined by curved lines and straight lines as shown in FIG. 12.

Figure 13:
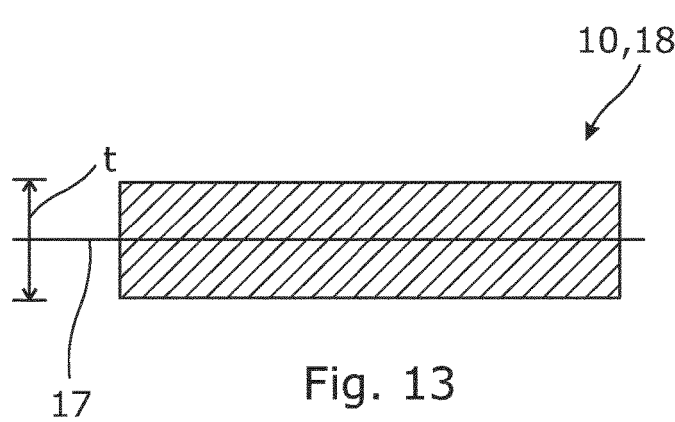

As seen in FIG. 13, the points 10, 18 may have a thickness t, the thickness t is larger than 0.5 mm, preferably larger than 1.0 mm. The thickness t of the point 10, 18 may extend in both directions with respect to a thickness of the sheet 17.

The conductive connection patch point and/or the conductive connection sheet point may be provided to a patch or a sheet, such as an expanded foil or mesh by
melting a conductive material,
applying the melted conductive material in a liquid state for surrounding the expanded foil or mesh,
allowing the melted material to harden for providing a mechanical and electric conductive connection between the point and the expanded foil or mesh.

The conductive connection patch point and/or the conductive connection sheet point may be provided to a patch or a sheet, such as an expanded foil or mesh by
providing two solid discs,
arranging the two solid discs on each side of the patch or sheet,
soldering two solid discs to the patch or sheet.

The melting of material may be performed by electrical induction heating or electrical resistive heating.

The melted connective material may be applied by pouring it into a mould arranged in connection with the expanded foil or mesh. The mould defining the outer periphery of the point. The conductive material may be a metal such as tin.

The conductive connection patch point and/or the conductive connection sheet point may also be provided to a patch or a sheet, such as an expanded foil or mesh by
providing a moulded conductive material,
applying the moulded conductive material onto the expanded foil or mesh,
soldering the moulded conductive material for providing a mechanical and electric conductive connection between the point and the expanded foil or mesh.

The conductive connection patch point and/or the conductive connection sheet point may additionally be provided to a patch or a sheet, such as an expanded foil or mesh by
providing at least two discs being made of conductive material,
arranging the two discs on opposite sides of the expanded foil or mesh,
fastening the discs to each other with the expanded foil or mesh between them for providing an electric conductive connection between them.

The discs may be fastened to each other by a mechanical connection.

In another embodiment, the discs may be fastened to each other by pressing and cold forging the two discs together around the expanded foil or mesh by plastic deformation.

Furthermore, the discs may be fastened to each other by spot welding.

Also, the discs may be fastened to each other by pulse-melting.

In addition, the discs may be fastened to each other by applying a conductive adhesive between the discs and maintaining the discs in position until the adhesive is cured.

Figure 14:
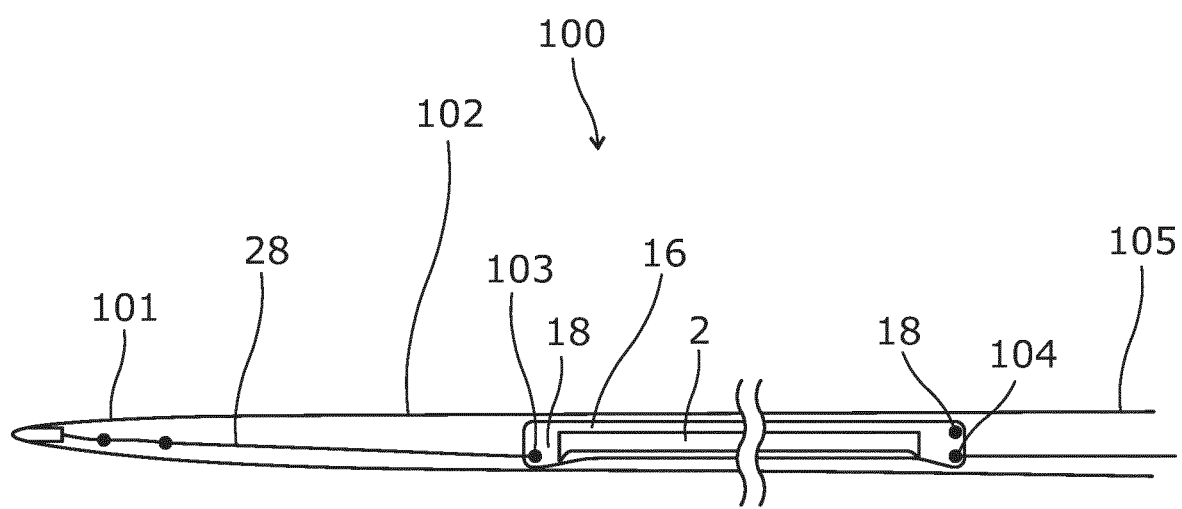
FIG. 14 shows schematically a CFRP element arranged in a wind turbine blade and a lightning protection system.

In FIG. 14 a lightning protection system 100 is shown schematically. The lightning protection system 100 comprises a first down conductor 28 extending from the tip end 101 of a wind turbine blade 102 to a tip connection block 103 arranged at a predetermined distance from the tip end, the single down conductor 28 being electrically connected with the tip connection block 103.

Furthermore, a second down conductor 16 extending from the tip connection block 103 between and along the CFRP structural element 2 and the pressure side towards a root connection block 104 arranged at the root end 105.

In addition, a third down conductor (not shown in FIG. 14) extending from the tip connection block between and along the structural element and the suction side towards the root connection block.

The second down conductor comprises a first sheet and the third down conductor comprises a second sheet, the first sheet and the second sheet are made of a conductive material for functioning as down conductors.

The first sheet and the second sheet comprise a plurality of conductive connection sheet points 18, the conductive connection sheet points are arranged in the vicinity of the tip connection block 103 and the root connection block 104 and are electrically connected with the tip connector block and the root connector block, respectively.

Hereby, the tip connection block 103 serve as the interface between the single down conductor 28 from the tip of the wind turbine blade 102, to the first sheet and the second sheet in each blade shell acting as down conductors from a tip part of the CFRP spar or beam. In addition, bonding or equipotentialization between pressure side down conductor, i.e. first sheet, and suction side down conductor, i.e. second sheet, is performed in one unit. At the same time, the second down conductor and third down conductor act as a receptor base for strikes attaching to the tip of the sheets. The part 103 is carefully designed to handle the full lightning current and avoid interception failures due to its insulating casting.

Figure 15:
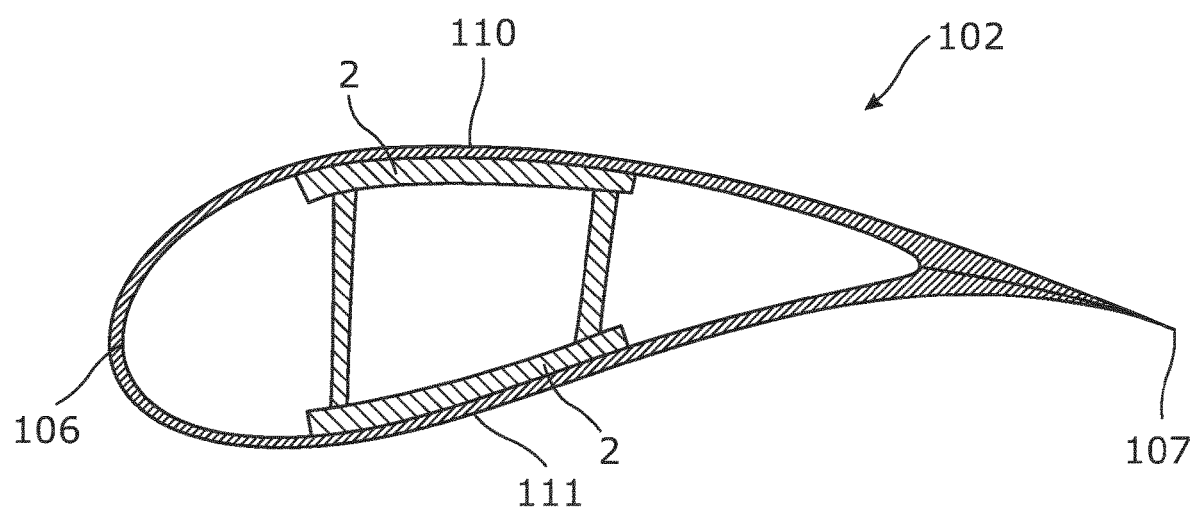
FIG. 15 shows a cross-section view through a wind turbine bade.

In FIG. 15, a cross-sectional view of wind turbine blade 102 is shown. The wind turbine blade 102 has a pressure side 111 and a suction side 110, the pressure side 111 and the suction side 110 are the outer faces of the wind turbine blade 102. The wind turbine blade 102 has also a leading edge 106 and a trailing edge 107. The wind turbine blade 102 has a CFRP structural element 2 extending along the longitudinal axis, the CFRP structural element 2 is a spar or beam being electrically conductive. The CFRP spar or beam enhances the strength of the wind turbine blade 102. The present embodiment shows that the CFRP elements 2 are arranged in the shells of the wind turbine blade 102. The CFRP elements may be connected via webs being made for instance as a sandwich structure of GFRP and core materials (PVC foam or balsa wood).

Figure 16:
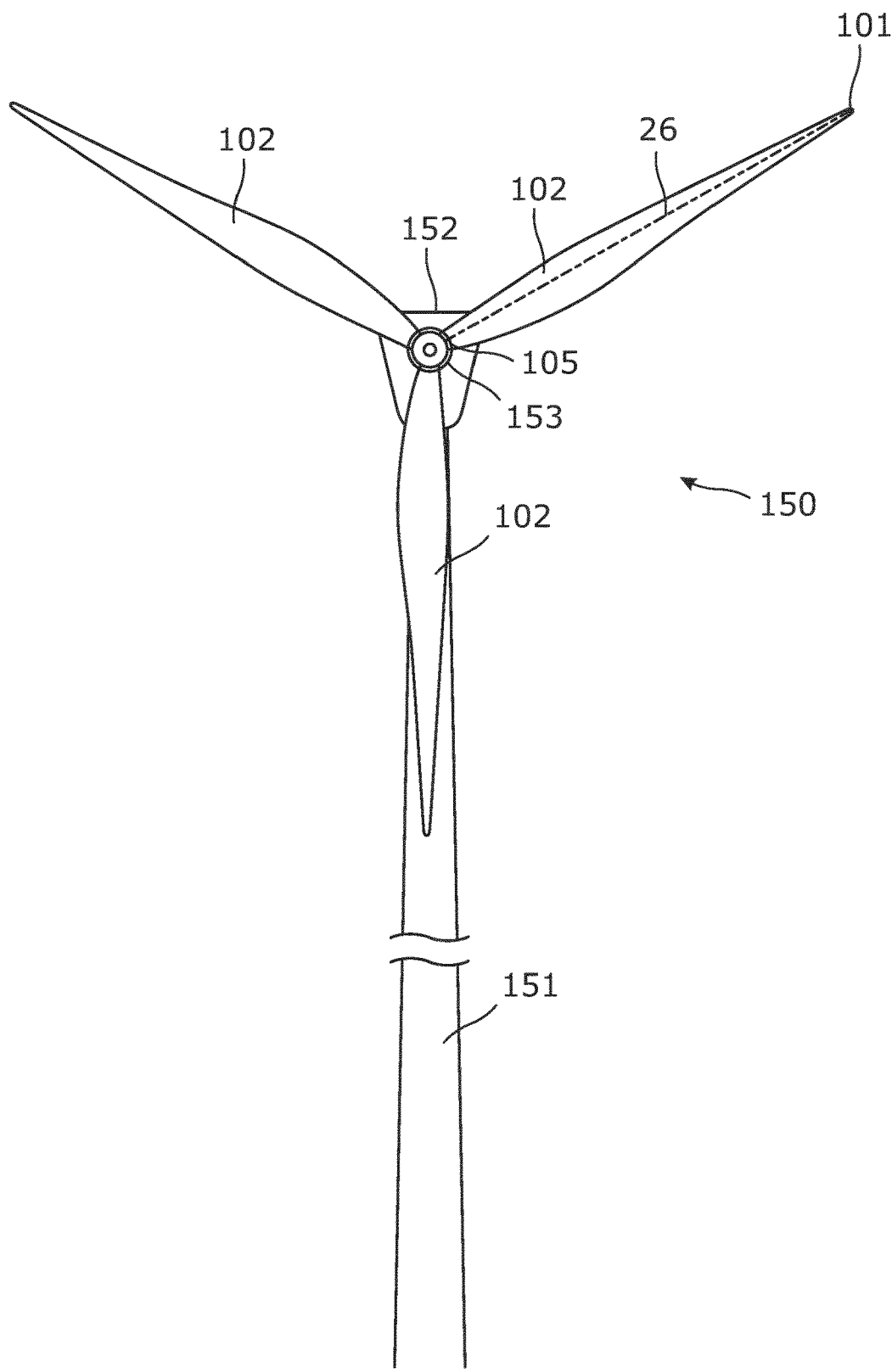
FIG. 16 shows a wind turbine having three wind turbine blades.

FIG. 16 shows a wind turbine 150 having a tower 151, a nacelle 152 and three wind turbine blades 102. Each wind turbine blade 102 has a root end 105 connected to a hub 153 and a tip end 101. The wind turbine blade 101 has a longitudinal axis 26 extending from the root end 102 to the tip end 103.

Although the invention has been described in the above in connection with preferred embodiments of the invention, it will be evident for a person skilled in the art that several modifications are conceivable without departing from the invention as defined by the following claims.

The invention claimed is:

1. A conductive connection between a Carbon Fiber Reinforced Polymer (CFRP) element and one or more down conductor(s), the CFRP element being electrically conductive and comprises a face, the conductive connection comprising:
    an interface conductive patch provided on the face of the CFRP element for electrically connecting the CFRP element with the interface conductive patch, the interface conductive patch is electrically connected with one or more down conductor(s);
    wherein the one or more down conductor(s) comprises a down conductor comprising a sheet and/or a cable, wherein the interface conductive patch comprises a conductive connection patch point being configured to electrically connect the interface conductive patch to the down conductor comprising the sheet and/or the cable; and
    wherein the conductive connection patch point comprises a first disc and a second disc, wherein the first disc and the second disc are arranged on opposite sides of the conductive connection patch and being connected to each other.

2. The conductive connection according to claim 1, wherein a conductive coating is applied on a part of the face, the conductive coating being applied as an intermediate layer between the face and the interface conductive patch.

3. The conductive connection according to claim 2, wherein the conductive coating is applied by electroplating, brush, spraying, or dipping.

4. The conductive connection according to claim 2, wherein the conductive coating is configured to ensure proper conductivity between the CFRP element and the interface conductive patch.

5. The conductive connection according to claim 2, wherein the interface conductive patch is arranged opposite the conductive coating and fastened to the conductive coating by providing a structured layer of carbon fibers over the interface conductive patch.

6. The conductive connection according to claim 1, wherein the interface conductive patch is provided by sandwiching the interface conductive patch between a first structured layer of carbon fibers and a second structured layer of carbon fibers, the first structured layer of carbon fibers is applied on the face.

7. The conductive connection according to claim 1, wherein the interface conductive patch comprises metal.

8. The conductive connection according to claim 1, wherein the interface conductive patch is a woven patch mesh or expanded metal patch foil.

9. The conductive connection according to claim 1, wherein the interface conductive patch comprises a first part being configured to be connected with the face and a second part being outside the face, the first part and the second part are electrically connected.

10. The conductive connection according to claim 1, wherein the sheet is an expanded metal foil or woven metal mesh.

11. The conductive connection according to claim 1, wherein the sheet comprises one or more conductive connection sheet points.

12. The conductive connection according to claim 1, wherein the CFRP element is a structural element.

13. The conductive connection according to claim 1, wherein the CFRP element is a girder or a spar arranged in a wind turbine blade.

14. The conductive connection according to claim 1, wherein the CFRP element comprises pultruded carbon members.

15. A lightning protection system comprising a conductive connection comprising:
    an interface conductive patch provided on a face of a Carbon Fiber Reinforced Polymer (CFRP) element for electrically connecting the CFRP element with the interface conductive patch, the interface conductive patch is electrically connected with one or more down conductor(s);
    wherein the one or more down conductor(s) comprises a down conductor comprising a sheet and/or a cable, wherein the interface conductive patch comprises a conductive connection patch point being configured to electrically connect the interface conductive patch to the down conductor comprising the sheet and/or the cable; and
    wherein the conductive connection patch point comprises a first disc and a second disc, wherein the first disc and the second disc are arranged on opposite sides of the conductive connection patch and being connected to each other.

16. A wind turbine blade comprising a lightning protection system comprising a conductive connection comprising:
    an interface conductive patch provided on a face of a Carbon Fiber Reinforced Polymer (CFRP) element for electrically connecting the CFRP element with the interface conductive patch, the interface conductive patch is electrically connected with one or more down conductor(s);
    wherein the one or more down conductor(s) comprises a down conductor comprising a sheet and/or a cable, wherein the interface conductive patch comprises a conductive connection patch point being configured to electrically connect the interface conductive patch to the down conductor comprising the sheet and/or the cable; and
    wherein the conductive connection patch point comprises a first disc and a second disc, wherein the first disc and the second disc are arranged on opposite sides of the conductive connection patch and being connected to each other.

17. A method of providing a conductive connection between a Carbon Fiber Reinforced Polymer (CFRP) element and one or more down conductor(s), wherein the conductive connection comprises:

an interface conductive patch provided on a face of a CFRP element for electrically connecting the CFRP element with the interface conductive patch, the interface conductive patch is electrically connected with one or more down conductor(s);

wherein the one or more down conductor(s) comprises a down conductor comprising a sheet and/or a cable, wherein the interface conductive patch comprises a conductive connection patch point being configured to electrically connect the interface conductive patch to the down conductor comprising the sheet and/or the cable; and wherein the conductive connection patch point comprises a first disc and a second disc, wherein the first disc and the second disc are arranged on opposite sides of the conductive connection patch and being connected to each other;

wherein the method comprises:
  providing the CFRP element comprising a face;
  providing the interface conductive patch; and
  applying the interface conductive patch on the face of the CFRP element for ensuring electrically connection between the CFRP element and the interface conductive patch.

18. The method according to claim 17, whereby a conductive coating is applied on the face before the interface conductive patch is applied on the conductive coating and the face, the conductive coating is applied by electroplating, brush, spraying, or dipping.

19. The method according to claim 18, whereby the face is cleaned and/or sanded before the conductive coating is applied.

20. The method according to claim 18, whereby the electroplating is performed by:
  providing the CFRP element as a cathode;
  providing a coating solution;
  providing a sacrificial anode; and
  applying a current by an external power supply.

* * * * *